US006415161B1

(12) United States Patent
Fujita

(10) Patent No.: US 6,415,161 B1
(45) Date of Patent: Jul. 2, 2002

(54) MOBILE COMMUNICATION SYSTEM WITH TRANSMITTING SYSTEMS WITH DIFFERENT OUTPUTTING POWER

(75) Inventor: Noriyuki Fujita, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/388,196

(22) Filed: Sep. 1, 1999

(30) Foreign Application Priority Data

Sep. 11, 1998 (JP) .......................................... 10-258588

(51) Int. Cl.[7] .................................................. H04B 1/38
(52) U.S. Cl. ........................ 455/561; 455/562; 455/456
(58) Field of Search ............................... 455/440, 456, 455/457, 25, 562, 97, 500, 526, 73, 561, 522, 443, 444; 370/337, 347, 442

(56) References Cited

U.S. PATENT DOCUMENTS

| 5,050,234 A | * | 9/1991 | Ohteru ........................ 455/509 |
| 5,276,686 A | * | 1/1994 | Ito .............................. 455/450 |
| 5,642,405 A | * | 6/1997 | Fischer et al. .............. 455/444 |
| 5,652,764 A | * | 7/1997 | Kanzaki et al. ............. 375/130 |
| 5,719,857 A | * | 2/1998 | Heikkinen ................... 370/330 |
| 5,809,422 A | * | 9/1998 | Raleigh et al. .............. 455/444 |
| 5,991,613 A | * | 11/1999 | Euscher et al. ............. 455/277.1 |
| 5,999,830 A | * | 12/1999 | Taniguchi et al. .......... 455/574 |
| 6,006,075 A | * | 12/1999 | Smith ........................... 455/101 |
| 6,188,913 B1 | * | 2/2001 | Fukagawa ................... 455/562 |

FOREIGN PATENT DOCUMENTS

| JP | 62-82731 | 4/1987 | |
| JP | 4-47722 | 2/1992 | |
| JP | 5-63634 | 3/1993 | |
| JP | 5-292010 | 11/1993 | |
| JP | 6-311089 | 11/1994 | |
| JP | 7-177570 | 7/1995 | |
| JP | 8-228375 | 9/1996 | |
| JP | 409191285 A | * 7/1997 | ............ H04B/7/26 |
| JP | 10-23498 | 1/1998 | |
| JP | 10-51380 | 2/1998 | |

OTHER PUBLICATIONS

Japanese Office Action dated Apr. 11, 2000, with English language translation of Japanese Examiner's comments.

* cited by examiner

*Primary Examiner*—Nay Maung
*Assistant Examiner*—Sonny Trinh
(74) *Attorney, Agent, or Firm*—Whitham, Curtis & Christofferson, P.C.

(57) ABSTRACT

A radio cell station apparatus includes a plurality of transmitters and a controller. The plurality of transmitters can transmit signals to a personal mobile station. The controller selectively activates one of the plurality of transmitters based on a positioning data corresponding to a position of the personal mobile station, such that the activated transmitter communicates with the radio cell station apparatus using a transmission signal.

16 Claims, 6 Drawing Sheets

R: RAMP TIME
SS: START SYMBOL
Pre: PREAMBLE
UW: UNIQUE WORD
CAC: COMMON ACCESS CHANNEL
CRC: CYCLIC REDUNDANCY CHECK BITS
I: INFORMATION BITS
G: GUARD BITS

MOBILE COMMUNICATION SYSTEM WITH TRANSMITTING SYSTEMS WITH DIFFERENT OUTPUTTING POWER

BACKGROUND OF THE INVENTION

1. Field of the Invention

The present invention relates to a mobile communication system with transmitting systems with different outputting power.

2. Description of the Related Art

A Personal Handy-phone System (PHS), formerly known as Personal Handy Phone (PHP), employs a four-channel multiplex TDMA (Time Division Multiple Access)—TDD (Time Division Duplex) method. The four-channel TDMA method implies that four signals are arranged in time series (four bursts). The cell station can communicate with a maximum of four personal mobile stations by using the four-channel TDMA method.

In a mobile communicating system such as PHS, the apparatus for the cell station (CS) is required to be miniaturized, of light weight and low power consumption, since the apparatus of the cell station services an infrastructure. Especially, flexibility in the manner of installation of the cell station is extremely important for a PHS system needing a large number of cell stations. From this viewpoint, the apparatus of the cell station which is made smaller and lighter is required. The cell station is installed in various manners, and the cell station is installed on a public telephone box, a telephone pole, a wall of a building, a housetop and the like in the outdoors, and installed on a ceiling, a public telephone base and the like in an underground market, an underpass and a building.

When a cell station having a plurality of channels has a plurality of transmitters, output powers of the respective transmitters are set to values identical to each other. Thus, the power consumption of the cell station is increased in proportion to the number of transmitters which the cell station has (by integer multiples).

Especially when the cell station has a high-power outputting transmitter, the high-power outputting transmitter generates a large amount of heat. As a result, the high-power outputting transmitter requires increasing the number of fins and making a surface area wider to improve the heat radiation as the solution. This results in a problem that the apparatus of the cell station is made large in size and heavy. Hence, the cell station becomes more expensive to manufacture and further the flexibility in the manner of installation is impaired.

Moreover, a high-power outputting power amplifier is expensive in itself. Thus, if the number of high-power outputting transmitters is increased, the cost of the cell station is correspondingly made largely expensive.

Therefore, it is necessary to develop a small cell station apparatus in which the heat generation amount is dropped and to reduce the cost while the quality of communication service is kept in a conventional level.

In addition, the following techniques have been traditionally provided, with regard to the mobile communicating method and the cell station.

Japanese Laid-Open Patent Application (JP-A-Showa 62-82731) describes the following conventional mobile communicating method. When a plurality of kinds of personal mobile stations whose transmission powers are different from each other are in one service area (for example, in an automobile telephone, a personal mobile station which is fixed in a vehicle and has a large transmission power, and a personal mobile station having a small transmission power which is portable after a user gets off), a plurality of slave cell stations having small transmission powers are installed in a service area of a master cell station having a large transmission power.

The above-mentioned mobile communication method needs a plurality of master and slave cell stations in the one service area and the above-mentioned mobile communication method becomes expensive. Also, the above-mentioned mobile communication method has the premise that there are a plurality of kinds of personal mobile stations whose transmission powers are different from each other. Thus, the above-mentioned problems can not be solved.

Japanese Laid-Open Patent Application (JP-A-Heisei 7-177570) describes the following radio telephone apparatus. This radio telephone apparatus has both functions of a cellular mode and a PHP (Personal HandyPhone) mode in a single radio telephone apparatus and can switch between incoming and outgoing calls as a cellular type radio telephone apparatus if a user is not located within a PHP service area, or as a PHP type radio telephone apparatus if the user is located within the PHP service area.

The above-mentioned radio telephone apparatus has only a technique of giving the two-mode function to the single apparatus as the personal mobile station and then switching between the modes in accordance with a reception field strength. Thus this can not solve the problem of miniaturizing the apparatus of the cell station, decreasing the cost and reducing the heat generation.

Japanese Laid-Open Patent Application (JP-A-Heisei 10-23498) describes the following radio cell station, subscriber apparatus and operation method. This conventional example is provided with: a plurality of cell stations each containing a plurality of subscriber apparatuses; a hybrid section for integrating and treating signals, which are transmitted and received by the plurality of cell stations, between it and a single antenna; and a multiplexing/separating section for integrating and treating signals which are transmitted and received between the plurality of cell stations and an existing network, with regard to WLL (Wireless Local Loop) using PHS.

Japanese Laid-Open Patent Application (JP-A-Heisei 5-292010) describes the following method and apparatus for assigning a radio channel. A radio zone is divided into concentric circles of the same area. A cell station is positioned at a center of each of the concentric circles. The number of cell stations is equal to the number of channels which can be used in a whole system. A channel is assigned to each region. In a case of an occurrence of a channel assignment request, the corresponding channel and the vicinity are preferentially assigned to the region at which the personal mobile station is located.

Japanese Laid-Open Patent Application (JP-A-Heisei 10-51380) describes the following CDMA (Code Division Multiple Access) system, an apparatus for controlling its transmission power and a DBF antenna. A side of a cell station has a non-directional antenna and a directional antenna. A non-directional antenna section has a transmitting/receiving unit for transmitting to M personal mobile stations. Each of them has a power measuring unit and a comparator with a first standard value. A directional antenna section has a transmitting/receiving unit so as to be connected to (N−M) personal mobile stations. Each of them has a power measuring unit and a comparator with a second standard value. Those two standard values are established in accordance with a ratio of a reception power to an interference power density.

Japanese Laid-Open Patent Application (JP-A-Heisei 6-311089) describes the following method for again using a frequency. A cell station has a plurality of call channels which are divided into an interior area call channel apparatus group and an exterior area call channel apparatus group. A service area of the cell station is logically divided into an interior area and an exterior area on a concentric circle in accordance with a predicted traffic. A minimum desirable wave level in an interior area call channel apparatus is kept higher than a minimum desirable wave level in an exterior area call channel apparatus.

Japanese Laid-Open Patent Application (JP-A-Heisei 4-47722) describes the following method for controlling a radio assignment in a mobile communication. At first, in a plurality of cell stations installed in a service area, the individual cell station has a first antenna for targeting a first radio zone and a second antenna for targeting a second radio zone. Here, the second radio zone is narrower in region than the first radio zone. Also, a vertical in-plane directivity of the second antenna is facing further downward from that of the first antenna. Each cell station is designed to select an antenna used for communicating with a mobile station, in accordance with the relationship of magnitude between reception levels at both the antennas in an electric wave from the mobile machine.

Japanese Laid-Open Patent Application (JP-A-Heisei 8-228375) describes the following method for installing a radio channel. An inside cell base station and an outside cell base station are located at respective centers of an outside cell and an inside cell. Here, the inside cell base station carries out a radio communication with a mobile machine within the inside cell. The outside cell base station carries out a radio communication with a mobile station within the outside cell. A service area is divided by a plurality of outside cells. The inside cell whose diameter is thinner than that of the outside cell and whose center is located at a position substantially common to a central position of the outside cell is provided at each of the plurality of outside cells. A channel control circuit is designed such that utilization channels of the inside cell and the outside cell are installed at the optimal channels so as not to respectively bring about a third dimensional mutual modulation in the inside cell base station and the outside cell base station.

SUMMARY OF THE INVENTION

The present invention has been made to solve the above-explained problems.

Therefore, an object of the present invention is to provide a radio cell station apparatus which generates less heat, has a small size and is provided at a low cost.

Another object of the present invention is to provide a PHS public cell station apparatus which generates less heat, has a small size and is provided at a low cost.

Still another object of the present invention is to provide a mobile communicating method in which a radio cell station apparatus generates less heat, has a small size and is provided at a low cost.

Especially when the cell station has a high-power outputting transmitter, the high-power outputting transmitter generates a large amount of heat. As a result, the high-power outputting transmitter requires increasing the number of fins and making a surface area wider to improve the heat radiation as the solution. This results in a porblem that the apparatus of the cell station is made large in size and heavy. Hence, the cell station becomes more expensive to maufacture and further the flexibility in the manner of installation is impaired.

In the radio cell station, the plurality of transmitters may output the signals with respective different transmission powers.

In the radio cell station, the positioning data may correspond to an electric field strength of the transmission signal outputted by the radio cell station apparatus and received by the personal mobile station.

The radio cell station may further include a single body, such that the plurality of transmitters are accommodated inside the body.

In the radio cell station, the plurality of transmitters may include a first transmitter outputting the transmission signal at a rated power, and a second transmitter outputting the transmission signal at a power lower than the rated power.

In the radio cell station apparatus, the controller may include a distance measuring section measuring a distance from the radio cell station apparatus to the personal mobile station, and a transmitter selecting section selecting one of the first transmitter and the second transmitter as the activated transmitter based on the distance measured by the distance measuring section.

In the radio cell station apparatus, the controller may include a transmitter selecting section selecting any one of the first transmitter and the second transmitter as the activated transmitter based on a field strength of the transmission signal which is outputted by the radio cell station apparatus and are received by the personal mobile station, a data indicating the electric field strength being transmitted to the radio cell station.

In the radio cell station apparatus, a control channel used to control outgoing/incoming call may be assigned to a first signal outputted from the first transmitter.

In the radio cell station apparatus, a plurality of communication channels may be respectively assigned to a first signal outputted from the first transmitter and a second signal outputted from the second transmitter, and a first number of the communication channels assigned to the first signal and a second number of the communication channels assigned to the second signal may be respectively defined based on respective service areas determined by respective transmission powers of the first signal and the second signal.

In the radio cell station apparatus, a first signal outputted from the first transmitter may include a first frame assigned to four transmission slots, in which a control channel controlling outgoing/incoming calls and three communication channels are assigned to the four transmission slots of the first frame, and a second signal outputted from the second transmitter may include a second frame including four transmission slots, the three communication channels are assigned to three of the four transmission slots of the second frame.

In order to achieve another aspect of the present invention, the present invention provides a mobile communication method including:

(a) providing a radio cell station having a first transmitter outputting a first transmission signal at a first power and a second transmitter outputting a second transmission signal at a second power lower than the first power;

(b) obtaining data corresponding to a distance between the radio cell station and a personal station communicating with the radio cell station, and judging whether or not the data exceeds a pre-determined value;

(c) outputting the second transmission signal from the second transmitter of the radio cell station to the personal mobile station, when the data exceeds the pre-determined value; and (d) outputting the first transmission signal from the first transmitter of the radio cell station to the personal mobile station, when the data does not exceed the pre-determined value.

In the mobile communication method, the (c) outputting may further include (e) outputting the first transmission signal from the first transmitter of the radio cell station to the personal mobile station, when the data exceeds the pre-determined value and communication channels assigned to the second transmission signal outputted by the second transmitter are all busy, in which the communication channels are composed of the pre-determined number of transmission slots assigned to the second transmission signal.

In the mobile communication method, the data may be determined based on a field strength of the transmission signal which is outputted by the radio cell station and is received by the personal mobile station.

In the mobile communication method, a control channel used by controlling the outgoing/incoming call may be assigned to the first transmission signal outputted by the first transmitter. In order to achieve still another aspect of the present invention, the present invention provides a PHS public cell station apparatus including a single body, and a plurality of transmitters contained in the single body, in which the plurality of transmitters include a first transmitter which outputs a first transmission signal at a first power in which a plurality of slots assigned to a first frame in the first transmission signal are composed of a control channel used by controlling outgoing/incoming call and a plurality of the communication channels capable of communicating a plurality of mobile station at the same time, and a second transmitter which outputs a second transmission signal at a second power lower than the first power in which a plurality of slots assigned to a second frame in the second transmission signal are composed of a plurality of the communication channels.

In the PHS public cell station apparatus, the first frame may be provided with one slot assigned to the control channel and three slots assigned to the communication channels, and the second frame may be provided with three slots assigned to the communication channels.

The PHS public cell station apparatus may further include a controller selectively activating one of the first transmitter or second transmitter based on positioning data corresponding to a position of the personal mobile station such that the activated transmitter communicates with the PHS public cell station apparatus using a transmission signal.

In the PHS public cell station apparatus, the first transmitter may communicate with a personal mobile station in a first transmitting area, and the second transmitter may communicate with a personal mobile station in a second transmitting area communicating in which all of the second transmitting area is inside the first transmitting area, and the PHS public cell station apparatus may further include a controller which controls the first transmitter to be activated when a personal mobile station communicating with the PHS public cell station apparatus is inside the first transmitting area except the second transmitting area or when the personal mobile station is inside the second transmitting area and all of the communication channels of the second transmitter is assigned to another personal mobile stations, and which controls the second transmitter to be activated when the personal mobile station is inside the second transmitting area and at least one of the communication channels of the second transmitter is not assigned to another personal mobile stations.

DESCRIPTION OF THE PREFERRED EMBODIMENTS

Referring now to drawings, a radio cell station apparatus according to the present invention will be described.

This radio cell station apparatus according to the present invention relates to a PHS public cell station apparatus.

Figure 1:
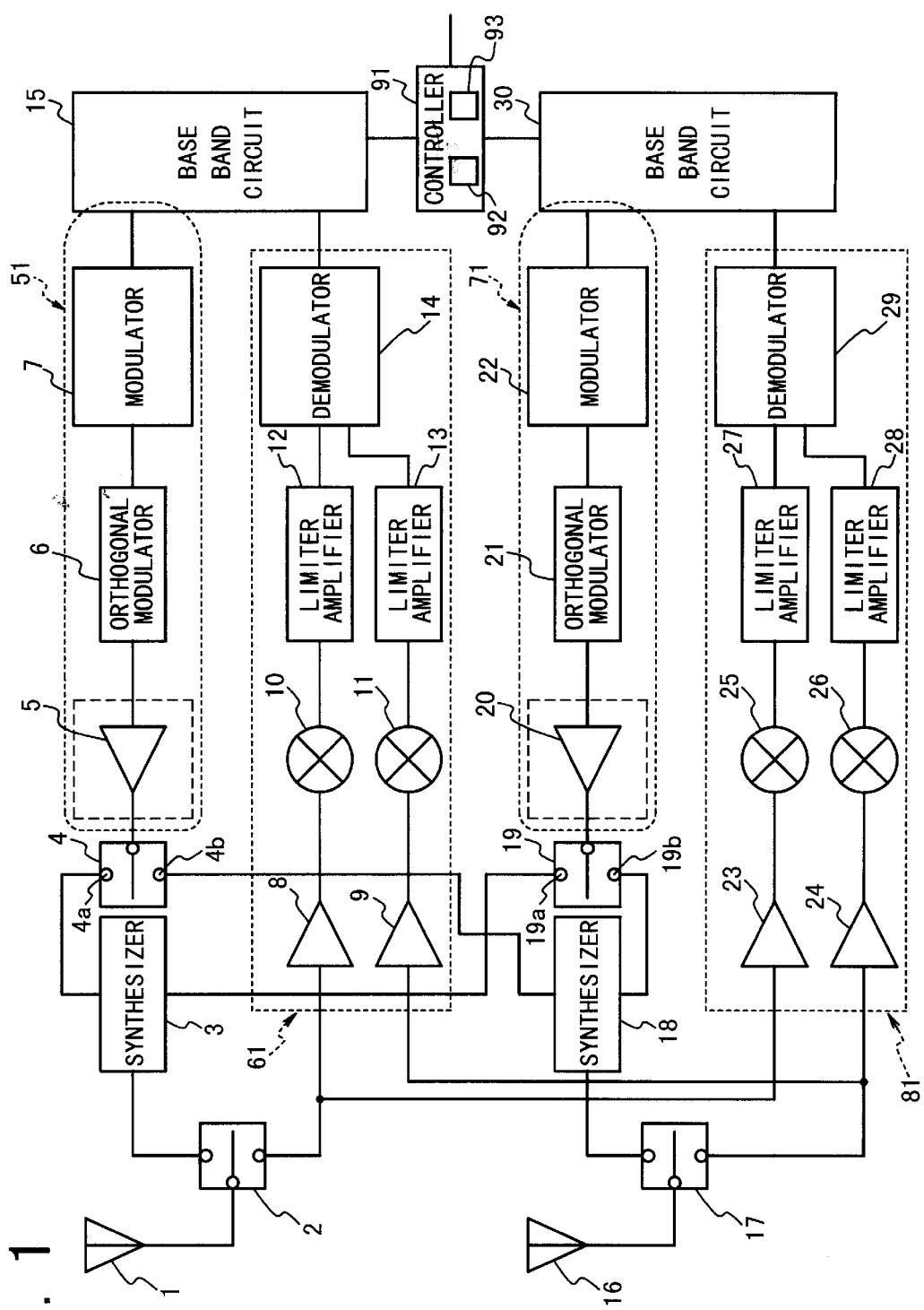
FIG. 1 is a view showing a circuit block of a PHS public cell station apparatus in this embodiment of the invention.

FIG. 1 shows a circuit block of the PHS public cell station apparatus in the embodiment according to the present invention.

Shown in FIG. 1, the PHS public cell station apparatus (CS: cell station) in this embodiment includes two antennas 1, 16, two transmitting/receiving switches 2, 17, two synthesizers 3, 18, two antenna switches 4, 19, two transmitting circuits (transmitters) 51, 71, two receiving circuits (receivers) 61, 81, two base band circuits 15, 30 and a controller 91.

The antennas 1, 16 transmit/receive signals (electric waves) in the air.

The transmitting/receiving switches 2, 17 switch the antennas 1, 16 when transmitting or receiving signals (electric waves).

The controller 91 includes a distance measuring section 92 and a transmitter selecting section 93. The distance measuring section 92 gains the strength of the reception signal transmitted by the personal mobile station to the cell station. The transmitter selecting section 93 selectively transmits the transmission signal for the personal mobile station to any one of two transmitters 51, 71 based on the strength of the reception signal. The controller 91 can be provided within the cell station apparatus. The controller 91 can be provided outside the cell station apparatus and connected to the cell station apparatus.

One of two transmitters 51, 71 is a high-power outputting transmitter 51 which outputs signals at a high power and the other is a low-power outputting transmitter 71 which outputs signals at a low power.

The high-power outputting transmitter 51 is composed of a part of the base band circuit 15, the modulator 7, the orthogonal modulator 6 and the high-power outputting amplifier 5. The low-power outputting transmitter 71 is composed of the base band circuit 30, the modulator 22, the orthogonal modulator 21 and the low-power outputting amplifier 20.

The base band circuit 15 (30) converts an analog voice signal inputted from a microphone into a digital signal, encodes an error correcting code to the digital signal, and interleaves and scrambles the encoded digital signal to generate a transmitting frame.

The modulator 7 (22) modulates the transmitting frame which is transmitted by the base band circuit 15 (30) by a root role-off to generate a π/4 shift QPSK base band signal. The modulator 7 (22) modulates the transmitting frame to two sets of base band modulating signals. One of the base band modulating signals is composed of an in-phase channel of the π/4 shift QPSK and the other is composed of a quadrature phase channel of the π/4 shift QPSK.

The orthogonal modulator 6 (21) modulates a carrier wave generated by a frequency synthesizing circuit (not shown) with the π/4 shift QPSK base band signal which is transmitted by the modulator 7 (22). The orthogonal modulator 6 (21) receives the in-phase channel and the quadrature phase channel in the π/4 shift QPSK to synthesize them at an intermediate frequency between the in-phase channel and the quadrature phase channel in the π/4 shift QPSK.

A modulated wave modulated by the orthogonal modulator 6 is amplified by the high-power outputting amplifier 5. A modulated wave modulated by the orthogonal modulator 21 is amplified by the low-power outputting amplifier 20.

The high-power outputting amplifier 5 included in the high-power outputting transmitter 51 outputs the modulated wave modulated by the orthogonal modulator 6 with a transmitting output (rated output) of 200 mW. The low-power outputting amplifier 20 included in the low-power outputting transmitter 71 outputs the modulated wave modulated by the orthogonal modulator 21 with a transmitting output of 20 mW which is lower than the rated output.

The antenna switches 4, 19 switch whether the antenna 1 or the antenna 16 from which the transmitting signals outputted from the respective transmitters 51, 71 are outputted for achieving a transmitting diversity by switching transmitting antennas.

The synthesizer 3 (18) synthesizes the two signals outputted from the respective transmitters 51, 71 to make into one signal for outputting the synthesized signal from one antenna (any one of the antennas 1, 16). As described later, a control channel signal is always outputted by the high-power outputting transmitter 51. When the low-power outputting transmitter 71 transmits a communication channel signal, the synthesizer 3 (18) synthesizes both the control channel signal and the communication channel signal.

The receiver 61 is composed of two RF (Radio Frequency) amplifiers (low noise amplifiers) 8, 9, two mixer (frequency converters) 10, 11, two limiter amplifier 12, 13, and a demodulator 14. the receiver 81 is composed of two RF (Radio Frequency) amplifiers (low noise amplifiers) 23, 24, two mixer 25, 26, two limiter amplifier 27, 28, and a demodulator 29. Here, the signal which the antenna 1 receives are branched into two components. one of them is transmitted through the RF amplifiers 8, the mixer 10, the limiter amplifiers 12 to the demodulator 14, the other is transmitted through the RF amplifiers 23, the mixer 25, the limiter amplifiers 27 to the demodulator 29. Moreover, the signal which the antenna 16 receives are branched into two components. one of them is transmitted through the RF amplifiers 9, the mixer 11, the limiter amplifiers 13 to the demodulator 14, the other is transmitted through the RF amplifiers 24, the mixer 26, the limiter amplifiers 28 to the demodulator 29.

The signal transmitted from the personal mobile station (PS) to the cell station is received by both the two antennas 1, 16. Here, the signal received by the antenna 1 is branched into two components, and amplified by respective RF amplifiers (low noise amplifiers) 8, 23. The respective RF amplifiers 8, 23 amplify the receiving signals in a high frequency (RF) band at a low noise, respectively. Moreover, the signal received by the antenna 16 is branched into two components, and amplified by respective RF amplifiers (low noise amplifiers) 9, 24. The respective RF amplifiers 9, 24 amplify the receiving signals in a high frequency (RF) band at a low noise, respectively.

The signals amplified by the respective RF amplifiers 8, 23 are inputted to mixers (frequency converters) 10, 25, respectively. The respective mixers 10, 25 convert (down convert) the inputted signals in the RF band with the intrinsic local frequencies generated by the frequency synthesizer circuits corresponding to the respective mixers 10, 25, into the signals in an intermediate frequency (IF) band. Accordingly, the respective two signals inputted from the antenna 1 are down converted to generate the two desirable IF signals. Otherwise, the signals amplified by the respective RF amplifiers 9, 24 are inputted to mixers (frequency converters) 11, 26, respectively. The respective mixers 11, 26 convert (down convert) the inputted signals in the RF band with the intrinsic local frequencies generated by the frequency synthesizer circuits corresponding to the respective mixers 11, 26, into the signals in an intermediate frequency (IF) band. Accordingly, the respective two signals inputted from the antenna 16 are down converted to generate the two desirable IF signals.

The signals converted into the IF band by the respective mixers 10, 25 are inputted to respective limiter amplifiers 12, 27. Each of the limiter amplifiers 12, 27, amplifies the inputted signal in which a gain is 80 dB or more to be saturated, and an excessive amplitude component of the inputted signal is removed. The respective limiter amplifiers 12, 27 absorb amplitude errors of the inputted signal to protect to receive the influence of amplitude variation based on the magnitude of the inputted signal. Otherwise, the signals converted into the IF band by the respective mixers 11, 26 are inputted to respective limiter amplifiers 13, 28. In each of the limiter amplifiers 13, 28, the inputted signal is amplified to saturation by an amplifier in which a gain is 80 dB or more, and an excessive amplitude component of the inputted signal is removed. The respective limiter amplifiers 13, 28 absorb amplitude errors of the inputted signal to protect to receive the influence of amplitude variation based on the magnitude of the inputted signal.

A demodulator 14 (29) demodulates the π/4 shift QPSK modulating wave, and controls the diversity reception. Here, the demodulator 14 demodulates the π/4 shift QPSK modulating wave based on the signals inputted by the respective limiter amplifiers 12, 13. Otherwise, the demodulator 29 demodulates the π/4 shift QPSK modulating wave based on the signals inputted by the respective limiter amplifiers 27, 28.

The base band circuit 15 (30) establishes a frame synchronization from a received base band signal reproduced by the demodulator 14 (29) and the synchronized frame is multiplex separated, de-scrambled, de-interleaved, and restored an error correcting code.

Here, the PHS public cell station apparatus in this embodiment has two transmitters 51, 71 and has six channels each of which is used to communicate between the cell station and one personal mobile station. In this embodiment, two transmitters are a high-power outputting transmitter 51 which outputs signals with a high power and a low-power outputting transmitter 71 which outputs signals with a low power.

Moreover, a multiplex TDMA-TDD method with four channels is employed to the PHS public cell station apparatus of this embodiment as a PHS mobile communicating method. The PHS public cell station with the multiplex TDMA-TDD method transmits a transmitting data and receives a receiving data alternatively and multiplex transmits with respective channels in a plurality of radio carriers assigned to the PHS public cell station apparatus.

Also, the PHS public cell station apparatus of this embodiment has a diversity function.

Here, in the cell station, a diversity receiving method is to synthesize vector-synthesizing receiving signals in accordance with a magnitude of RSSI (Received Signal Strength Indicator). A diversity transmitting method is adopted when the signal transmits from a cell station to a personal mobile station. The transmitting method from the cell station to the personal mobile station is adopted to output from selected one of the antennas 1, 16 in which the RSSI of the receiving signal from the personal mobile station is the larger. The transmitting method is adopted an advantage of the TDD in which a frequency of an electric wave in a "downward" direction from the cell station to the personal mobile station is equal to a frequency of an electric wave in an "upward" direction opposite thereto.

Figure 2A:
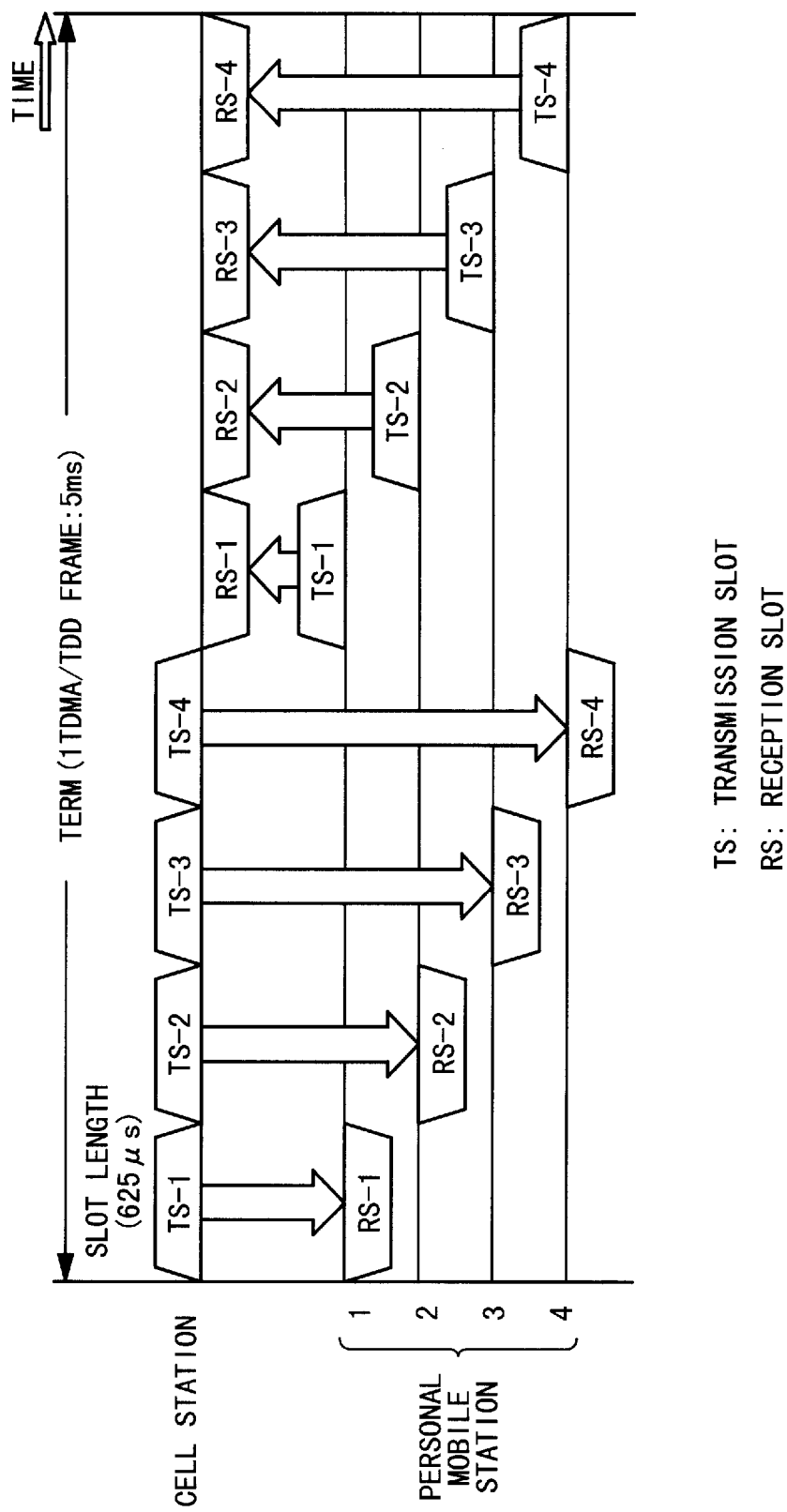
FIG. 2A is a view to explain a transmission/reception slot in a four-channel TDMA-TDD method used in PHS.

Here, the four-channel multiplex TDMA-TDD method employed in the cell station of this embodiment of the invention is described with reference to FIGS. 2A, 2B and 2C. The four-channel TDMA implies that four signals are arranged in time series (four bursts). In the PHS with the four-channel TDMA method, the cell station uses one of the four channels as the control channel and the other channels as the communication channels. Therefore, the cell station can communicate with a maximum of three personal mobile stations at the same time.

A period of one frame is 5 ms. One frame is composed of 8 slots. A period of one slot (one slot length) is 625 $\mu$s. One slot is composed of pulses of 240 bits.

In the PHS with the four-channel TDMA method, the 8 slots in one frame are used for the transmission or reception. Thus, the four slots in one frame are used for a transmission slot (refer to FIG. 4A). The cell station transmits four burst signals for the period of 625 $\mu$s to the respective four personal mobile stations connecting the cell station at a predetermined timing. The burst signal is obtained to compress a data for the period of 5 ms which the cell station transmits to one personal mobile station. Each personal mobile station compresses the transmitting data for the period of 5 ms to a burst signal for the period of 625 $\mu$s and transmits the burst signal at 2.5 ms after the personal mobile station has received the burst signal from the cell station.

Figure 2B:
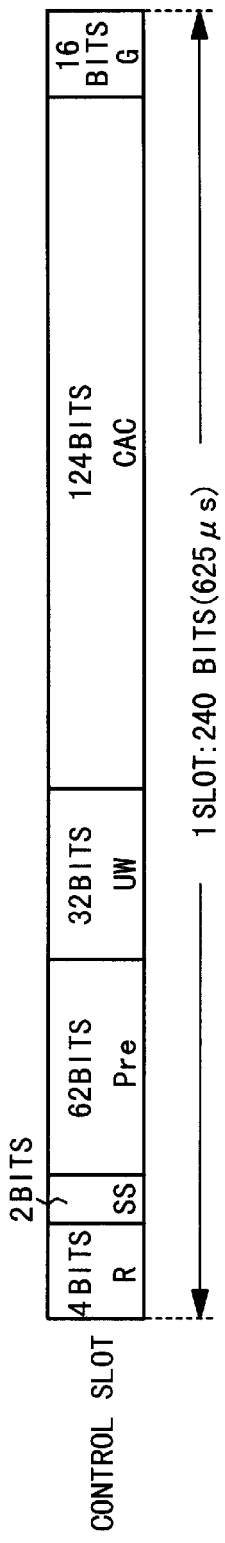
FIG. 2B is a view to explain a control slot in a four-channel TDMA-TDD method used in PHS.
Figure 2C:
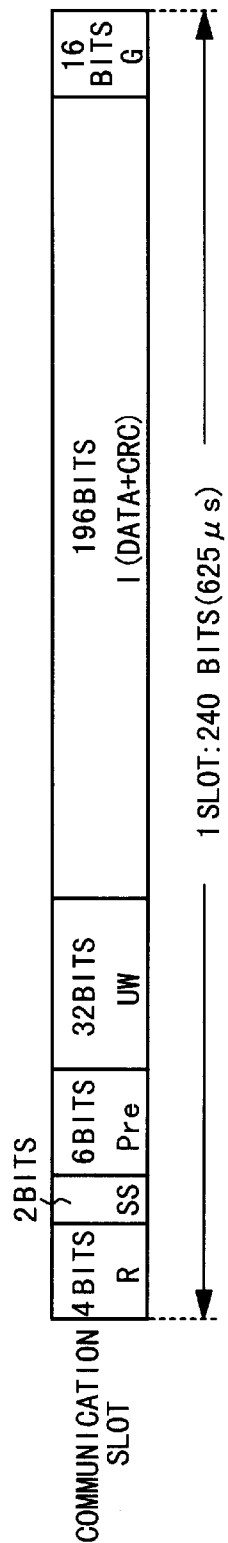
FIG. 2C is a view to explain a communication slot in a four-channel TDMA-TDD method used in PHS.

Referring to FIG. 2B and FIG. 2C, a control channel and a communication channel assigned to each of the slots will be described. FIG. 2B shows the contents of the control slot, and FIG. 2C shows the contents of the communication slot.

The control channel shared by all communicating units has a function for the outgoing/incoming call control.

Shown in FIG. 2B, the control channel is composed of a ramp time (R), a start symbol (SS), a preamble (Pre), a unique word (UW), a common access channel (CAC), and guard bits (G) which are arranged in time series.

The communication channel is assigned to the respective communicating unit for respectively communicating. Shown in FIG. 2C, the communication channel is composed of the ramp time (R), the start symbol (SS), the preamble (Pre), the unique word (UW), information bits (I), and guard bits (G) which are arranged in time series. Here, the information bits (I) are composed of transmitting data and the cyclic redundancy check bits (CRC).

The ramp time (R) is defined to smooth the trnasient conditions in a rising action and a trailing action of the burst signal to supress the influence on the other slots resulting from the sharp rising action of the burst signal. The start symbol (SS) is defined to report a start of a burst information.

The preamble (Pre) is defined to carry out a timing adjustment (bit synchronization) to enable communication between the cell station and the personal mobile station. Since this preamble is especially important at the time of starting communication, a long preamble of 62 bits is used for the control slot, and a short preamble of 6 bits is used for a communication slot used during a call. The unique word (UW) is composed of a special sign row and is used to establish the frame synchronization. When the receiving unit receives a burst signal, the receiving unit searches for this unique word from other signals and noises, and applies a selective filter to this unique word to establish frame synchronization of the burst signal. The common access channel (CAC) is composed of a control signal including an outgoing/incoming identification and report information. The cyclic redundancy check bits (CRC) are arranged to detect an error and carry out a re-transmission of a muting/control signal. The information bits (I) correspond to the transmitting data (voice or control signal). The guard bits (G) are arranged to prevent overlap by the plurality of slots received by the cell station because of an error which occurs in the accuracy of the communicating personal mobile stations and differences of the distance from the cell station.

Here, one frame includes four transmission slots. The cell station in this embodiment of the invention has two transmitters 51, 71 and can transmit the personal mobile stations with 8 slots in total as transmission slots.

When the conventional cell station has the two transmitters, the conventional cell station has the transmitters having the same output power. A power consumption of each of the transmitters which output at the power of 200 mW or more is large, increasing an amount of generated heat. As a result, a size of the cell station apparatus becomes extremely large.

The cell station requires a high-power outputting transmitter to enlarge the service area of the cell station. However, the cell station is not necessarily required to output with high power for all the 8 slots. When the personal mobile station is located near the cell station, the personal mobile station can receive the slot which the cell station outputs with lower power than the high-power outputting transmitter outputs.

Figure 3:
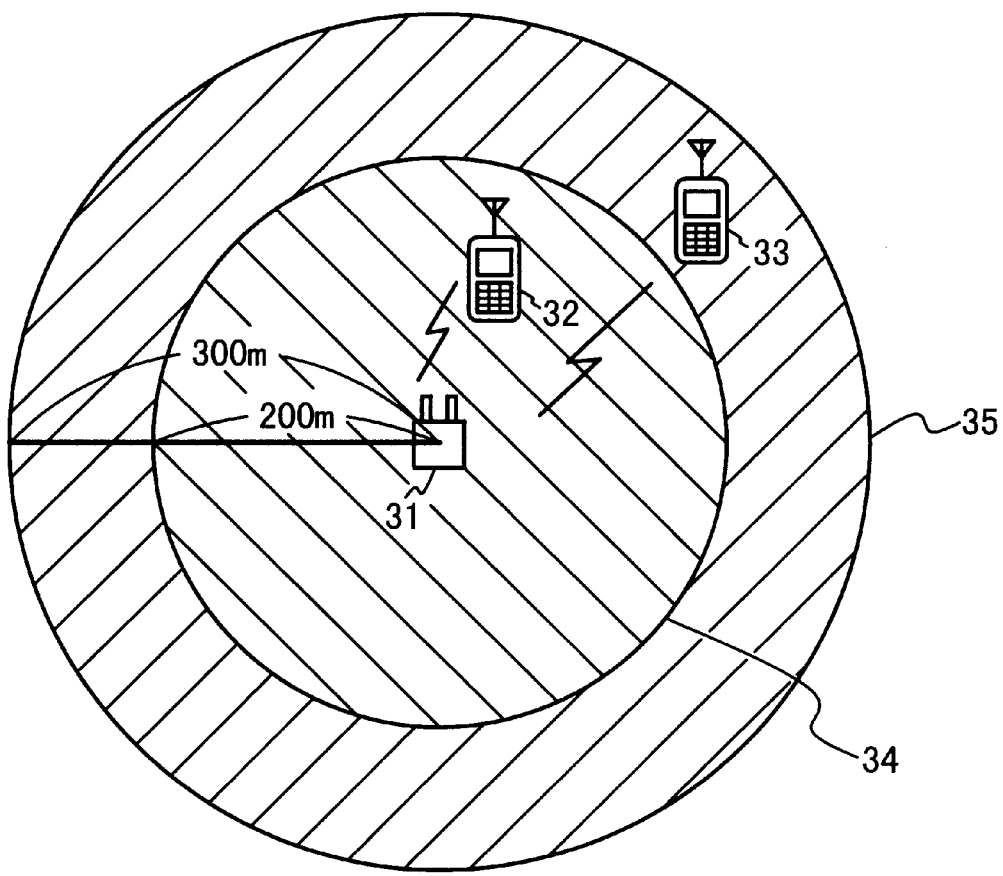
FIG. 3 is a configuration diagram of a service area of the PHS public cell station apparatus in this embodiment of the invention.

Here, Referring to FIG. 3, a service area of the cell station in this embodiment of the invention is described. The cell station 31 has a low-power signal transmitting area 34 within about 200 meters radius of the cell station 31 and a high-power signal transmitting area 35 within about 300 meters radius of the cell station 31 except the low-power signal transmitting area 34. A personal mobile station 32 in the low-power signal transmitting area 34 can receive the signal transmitted by both of the transmitters 51, 71 (not shown in FIG. 3). A personal mobile station 33 in the low-power signal transmitting area 35 can receive the signal transmitted by only the low-power outputting transmitter 71 (not shown in FIG. 3).

In the cell station of this embodiment of the invention, the high-power outputting transmitter 51 outputs signals with high power (at the power of 200 mW), and the low-power outputting transmitter 71 outputs with low power (at the power of 20 mW). Then, the PHS public cell station apparatus in this embodiment of the invention is designed to reduce the whole power consumption such that one of transmitters is designed to reduce the transmitting power.

When the value of the RSSI measured for the personal mobile station 32 is more than 40 dBμ, the cell station 31 whcih receives the data of the value of the RSSI judges such that the personal mobile station 32 is located in the low-power signal transmitting area 34. Therefore, the cell station 31 recognizes that, to communicate with the personal mobile station 32, the lower-power outputting transmitter can be used. As a result, the cell station 31 transmits to the personal mobile station with the low-power outputting transmitter 71 which outputs at the power of 20 mW.

Conversely, when the value of the RSSI measured for the personal mobile station 33 is less than 40 dBμ, the cell station 31 which receives the data of the value of the RSSI judges such that the personal mobile station 33 is located in the high-power signal transmitting area 35. Therefore, the cell station 31 recognizes that, to communicate with the personal mobile station 33, the higher-power outputting transmitter 51 should be used. As a result, the cell station 31 transmits to the personal mobile station 33 with the high-power outputting transmitter 51 which outputs at the power of 200 mW.

Figure 4A:
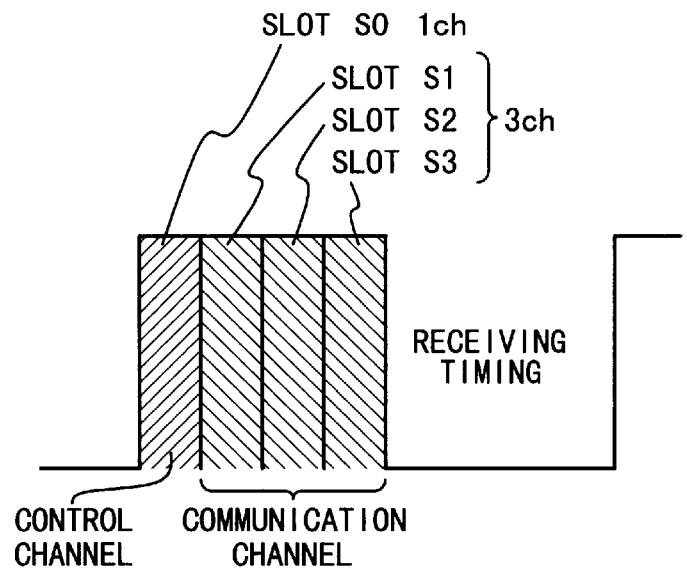
FIG. 4A is a configuration diagram of slots which are transmitted by a high-power outputting transmitter of the PHS public cell station apparatus in this embodiment of the invention.
Figure 4B:
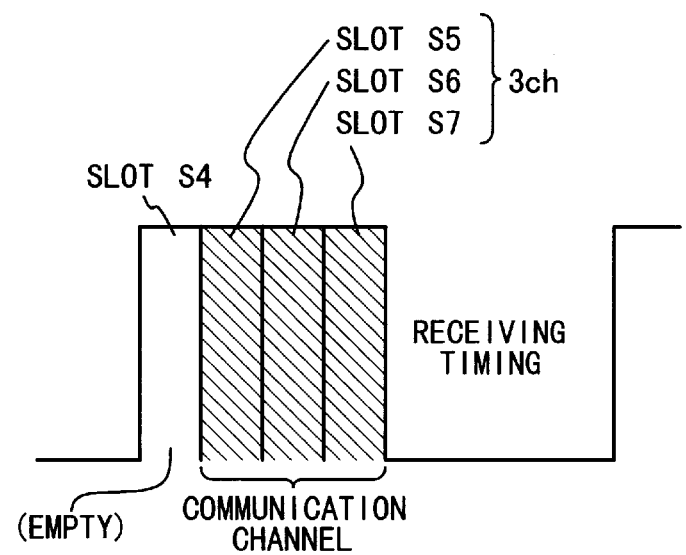
FIG. 4B is a configuration diagram of slots which are transmitted by a low-power outputting transmitter of the PHS public cell station apparatus in this embodiment of the invention.

Referring to FIGS. 4A and 4B, the three communication channels are respectively assigned to the low-power outputting transmitter 71 which outputs at the power of 20 mW and the high-power outputting transmitter 51 which outputs at the power of 200 mW. Shown in FIG. 4A, in the high-power outputting transmitter 51, the communication channels are assigned to three slots indicated by sign slots S1, S2 and S3 among four transmission slots, and the control channel is assigned to the remaining one slot (indicated by a sign slot S0). As shown in FIG. 4B, in the low-power outputting transmitter 71, the communication channels are assigned to three slots indicated by slots S5, S6 and S7 among four transmission slots, and the remaining one slot is an empty slot S4. Here, the control channel has a function for the outgoing/incoming call control and is employed by the personal mobile station which communicates to the cell station with the low-power outputting transmitter. The control channel is assigned to the slot S0 in the high-power outputting transmitter 51. The slot S4 in the low-power outputting transmitter 71 has the same output timing as the slot S0. Therefore, the slot S4 is set to be an empty slot. Accordingly, in the low-power outputting transmitter 71, the slot which has the same output timing as the slot assigned to the control channel in the high-power outputting transmitter 51 is set to be an empty slot.

At this time, the cell station 31 can transmit to the personal mobile station 32 in the low-power signal transmitting area 34 with the high-power outputting transmitter 51 which outputs at the power of 200 mW. When the channels S5, S6 and S7 are busy, the cell station 31 can transmit to the personal mobile station 32 in the low-power signal transmitting area 34 with any one of the channels S1, S2 and S3. Therefore, the cell station 31 can transmit to the personal mobile station 32 in the low-power signal transmitting area 34 with any one of the six channels S1 to S3 and S5 to S7. And the cell station 31 can transmit to the personal mobile station 33 in the high-power signal transmitting area 35 with any one of the three channels S1, S2 and S3. Here, the cell station 31 transmits to the personal mobile station 32 with any of the three channels S5, S6 and S7, preferentially.

Also, the cell station 31 has a function of switching the transmitting channel from the low-power outputting transmitter 71 to the high-power outputting transmitter 51, or from the high-power outputting transmitter 51 to the low-power outputting transmitter 71, by considering the condition of the channels when the personal mobile station moves from the low-power signal transmitting area 34 to the high-power signal transmitting area 35 or from the high-power signal transmitting area 35 to the low-power signal transmitting area 34 (hand-over).

Here, the cell station 31 can transmit the personal mobile station 32 in the low-power signal transmitting area 34 with any one of only the three channels S1, S2 and S3 outputted by the high-power outputting transmitter 51 which outputs at the power of 200 mW. However, it does not have substantial influence on communicating service between the cell station and the personal mobile station 32 due to the following reason.

The cell station 31 has the low-power signal transmitting area 34 within about 200 meters radius of the cell station 31 and the high-power signal transmitting area 35 within about 300 meters radius of the cell station 31 except the low-power signal transmitting area 34. Thus, an area rate of the low-power signal transmitting area 34 is about 56 percent of the all areas which the cell station 31 has. And an area rate of the high-power signal transmitting area 35 is about 44 percent of the all areas which the cell station 31 has. The size of the low-power signal transmitting area 34 is substantially equal to that of the high-power signal transmitting area 35. From the viewpoint of the possibility of busy traffic, it does not result in any statistical problem to assign each three channels to both areas.

Also, the high-power signal transmitting area 35 is outside of the low-power signal transmitting area 34 of which the cell station 31 is the center. The signal outputted by the low-power outputting transmitter 71 (at the power of 20 mW) does not interfere with the personal mobile station 33 within the high-power signal transmitting area 35 covered by the high-power outputting transmitter 51 (at the power of 200 mW).

Here, the distance of about 200 meters or 300 meters indicated as each effective radius of the low-power signal transmitting area 34 or the high-power signal transmitting area 35 is not a merely geographical distance but is added on the transmission environment of the electric wave. In this embodiment of the invention, the distance between the cell station and the personal mobile station is determined in accordance with the RSSI (Received Signal Strength Indicator) of the signal which is outputted by the cell station and is received by the personal mobile station. When an obstacle to the electric wave is provided between the personal mobile station and the cell station, the cell station receives the signal which is outputted by the personal mobile station and then weaken by the obstacle. In this case, the distance between the personal mobile station and the cell station is more largely estimated than the geometrical distance based on the RSSI of the signal received by the personal mobile station. As mentioned above, the distance from the cell station indicated in this embodiment of the invention is determined in accordance with the RSSI (Received Signal Strength Indicator) of the signal which is outputted by the cell station.

As mentioned above, the control channel is always outputted from the high-power outputting transmitter 51 in view of the communicating service, and it covers all the areas which the cell station has at the same time.

Thus, the high-power outputting transmitter 51 has three communication channels S1, S2 and S3 and one control channel S0, and the low-power outputting transmitter 71 has three communication channels S5, S6 and S7. Since the control channel is received by any personal mobile station within the all areas 34, 35 which the cell station has, the control channel S0 is outputted from a pre-determined antenna (for example, the antenna 1), without the transmitting diversity operation.

The following operations (1) to (4) are carried out in the synthesizers 3, 18 and the antenna switches 4, 19 to achieve the above-mentioned operations.

(1) Case of Outputting the Signal from Antenna 1 to the Low-Power Signal Transmitting Area 34

The switch 19 is connected to a contact 19a. The switch 4 is connected to a contact 4a. The synthesizer 3 synthesizes the communication channels S5, S6 and S7 from the low-power outputting transmitter 71 and the control channel S0 from the high-power outputting transmitter 51. The synthesized channel is outputted from the antenna 1.

(2) Case of Outputting the Signal from Antenna 1 to the High-Power Signal Transmitting Area 35

The switch 4 is connected to the contact 4a. Nothing is synthesized in the synthesizer 3. Then, the control channel S0 from the high-power outputting transmitter 51 and the communication channels S1, S2 and S3 are outputted from the antenna 1.

(3) Case of Outputting the Signal from Antenna 16 to the Low-Power Signal Transmitting Area 34

The switch 19 is connected to a contact 19b. The switch 4 is connected to the contact 4a. Nothing is synthesized in the synthesizer 18. Then, the communication channels S5, S6 and S7 from the low-power outputting transmitter 71 are outputted from the antenna 16, and then the control channel S0 from the high-power outputting transmitter 51 is outputted from the antenna 1.

(4) Case of Outputting the Signal from Antenna 16 to the High-Power Signal Transmitting Area 35

When the control channel S0 is transmitted, the switch 4 is connected to the contact 4a, and it is outputted through the high-power outputting transmitter 51 from the antenna 1. When the communication channels S1, S2 and S3 are transmitted, the switch 4 is connected to the contact 4b, and nothing is synthesized in the synthesizer 18. Then, they are outputted through the high-power outputting transmitter 51 from the antenna 16.

Figure 5:
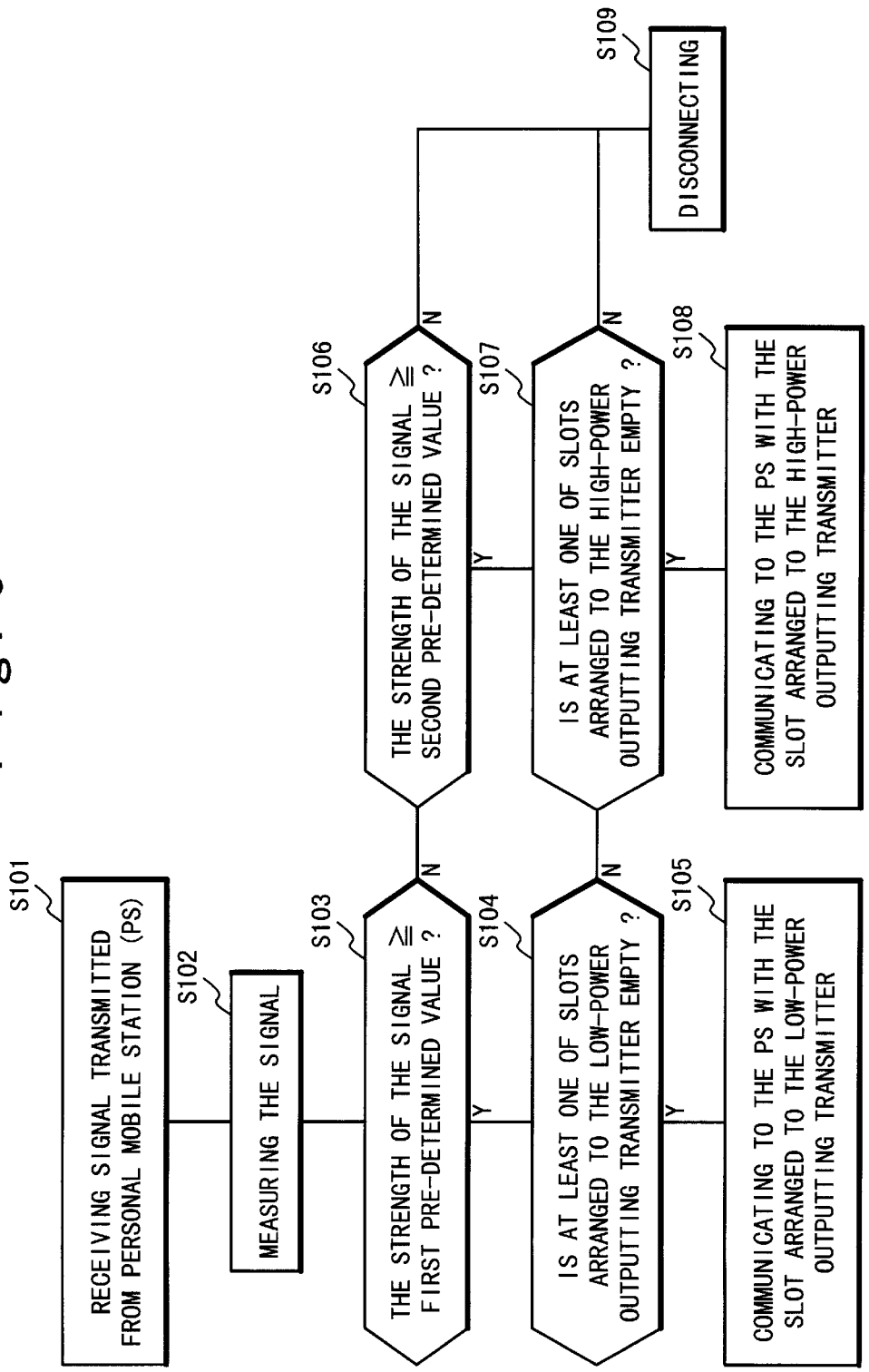
FIG. 5 is a flow chart representing the operation of the controller of the PHS public cell station apparatus in this embodiment of the invention.

Next, the operation of the controller 91 of the cell station in this embodiment of the invention is described on the reference to FIG. 5.

Here, the cell station communicates to the personal mobile station with each of six transmission slots arranged to the transmission signal. Three of the six transmission slots is arranged to the high-power outputting transmitter and the other of the six transmission slots is arranged to the low-power outputting transmitter. At the step of S101, the cell station receives the received signal transmitted by the personal mobile station. At the step of S102, the cell station measures the strength of the signal. At the step of S103, the cell station investigates whether or not the strength of the signal is more than or equal to first pre-determined value. When the strength of the signal is more than or equal to first pre-determined value (at the step of S103), the cell station investigates whether or not all of the slots arranged to the low-power outputting transmitter are used for communicating with another personal mobile stations (at the step of S104). When all of the slots arranged to the low-power outputting transmitter are not used for communicating with another personal mobile stations, the cell station communicates to the personal mobile station with the empty slot arranged to the low-power outputting transmitter (at the step of S105). When the strength of the signal is less than first pre-determined value (at the step of S103), the cell station investigates whether or not the strength of the signal is more than or equal to second pre-determined value (at the step of S106). Here, the second pre-determined value is less than the first pre-determined value. When the strength of the signal is more than or equal to second pre-determined value (at the step of S106) or all of the slots arranged to the low-power outputting transmitter are used for communicating with another personal mobile stations (at the step of S104), the cell station investigates whether or not all of the slots arranged to the high-power outputting transmitter are used for communicating with another personal mobile stations (at the step of S107). When all of the slots arranged to the high-power outputting transmitter are not used for communicating with another personal mobile stations (at the step of S107), the cell station communicates to the personal mobile station with the empty slot arranged to the high-power outputting transmitter (at the step of S108). When the strength of the signal is less than second pre-determined value (at the step of S106) or all of the slots arranged to the high-power outputting transmitter are used for communicating with another personal mobile stations (at the step of S107), the cell station disconnects with the personal mobile station.

The effects of the present invention will be described.

A heat of about 15 W is generated by the power amplifier used in the high-power outputting transmitter which outputs at the power of 200 mW. Thus, when the cell station has two high-power outputting transmitters, two power amplifiers in them generate a heat of about 30 W. On the contrary, when the cell station in this embodiment of the invention has one high-power outputting transmitter 51 which outputs at the power of 200 mW and one low-power outputting transmitter 71 of 20 mW, the high-power outputting transmitter 51 which outputs at the power of 200 mW. Here, a power amplifier used in the low-power outputting transmitter 71 generates a heat of about 1.7 W. The power amplifiers used in the cell station in this embodiment of the invention generates a heat of 16.7 W in total. Hence, the amount of heat generated by the cell station in this embodiment of the invention is about 44 percent less than that generated by conventional cell station with the two high-power outputting transmitters which outputs at the power of 200 mW.

Therefore, the high-power outputting transmitter requires increasing the number of fins and making a surface area wider to improve the heat radiation. Since the cell station in this embodiment of the invention enables less heat radiation, the cell station can decrease the number of fins and make a surface area narrower to improve the heat radiation, and the cell station itself can be miniaturized. Moreover, the cell station has only one power amplifier element of 200 MW and the production cost can be reduced. Furthermore, since the minaturization of the cell station can be realized, the cell station can be in installed with great flexibility and installed at various spaces.

What is claimed is:

1. A radio cell station apparatus comprising:
a plurality of transmitters for transmitting signals to a personal mobile station, at least one of said plurality of transmitters comprising a high power transmitter and a second of said plurality of transmitters comprising a lower power transmitter; and
a controller selectively activating one of said high power transmitter and said lower power transmitter based on a positioning data corresponding to a position of said personal mobile station, such that said activated transmitter communicates with said radio cell station apparatus using a transmission signal.

2. A radio cell station apparatus according to claim 1, wherein said positioning data correspond to an electric field strength of said transmission signal outputted by said radio cell station apparatus and received by said personal mobile station.

3. A radio cell station apparatus according to claim 1, further comprising a single body, such that said plurality of transmitters are accommodated inside said single body.

4. A radio cell station apparatus according to claim 1, wherein said controller includes:
a distance measuring section measuring a distance from said radio cell station apparatus to said personal mobile station; and
a transmitter selecting section selecting one of said high power transmitter and said lower power transmitter as said activated transmitter based on said distance measured by said distance measuring section.

5. A radio cell station apparatus according to claim 1, wherein said controller includes:
a transmitter selecting section selecting any one of said high power transmitter and said lower power transmitter as said activated transmitter based on a field strength of said transmission signal which is outputted by said radio cell station apparatus and are received by said personal mobile station, a data indicating said electric field strength being transmitted to said radio cell station.

6. A radio cell station apparatus according to claim 1, wherein a control channel used to control outgoing/incoming call is assigned to a first signal outputted from said first transmitter.

7. A radio cell station apparatus comprising:
a plurality of transmitters for transmitting signals to a personal mobile station; and
a controller selectively activating one of said plurality of transmitters based on a positioning data corresponding to a position of said personal mobile station, such that said activated transmitter communicates with said radio cell station apparatus using a transmission signal,
wherein said plurality of transmitters includes:
a first transmitter outputting said transmission signal at a rated power; and
a second transmitter outputting said transmission signal at a power lower than said rated power,
wherein a plurality of communication channels are respectively assigned to a first signal outputted from said first transmitter and a second signal outputted from said second transmitter, and
a first number of said communication channels assigned to said first signal and a second number of said communication channels assigned to said second signal are respectively defined based on respective service areas determined by respective transmission powers of said first signal and said second signal.

8. A radio cell station apparatus comprising:
a plurality of transmitters transmittable signals to a personal mobile station; and
a controller selectively activating one of said plurality of transmitters based on a positioning data corresponding to a position of said personal mobile station, such that said activated transmitter communicates with said radio cell station apparatus using a transmission signal,
wherein said plurality of transmitters includes:
a first transmitter outputting said transmission signal at a rated power; and
a second transmitter outputting said transmission signal at a power lower than said rated power,
wherein a first signal outputted from said first transmitter includes:
a first frame assigned to four transmission slots, wherein a control channel controlling outgoing/incoming call and three communication channels are assigned to said four transmission slots of said first flame, and wherein a second signal outputted from said second transmitter includes:
a second frame including four transmission slots, said three communication channels are assigned to three of said four transmission slots of said second flame.

9. A mobile communication method comprising:
(a) providing a radio cell station having a first transmitter outputting a first transmission signal at a first power and a second transmitter outputting a second transmission signal at a second power lower than said first power;
(b) obtaining data corresponding to a distance between said radio cell station and a personal station communicating with said radio cell station, and judging whether or not said data exceeds a pre-determined value;
(c) outputting said second transmission signal from said second transmitter of said radio cell station to said personal mobile station, when said data exceeds said pre-determined value; and
(d) outputting said first transmission signal from said first transmitter of said radio cell station to said personal mobile station, when said data does not exceed said pre-determined value.

10. A mobile communication method according to claim 9, wherein said data is determined based on a field strength of said transmission signal which is outputted by said radio cell station and is received by said personal mobile station.

11. A mobile communication method according to claim 9, wherein a control channel used by controlling the outgoing/incoming call is assigned to said first transmission signal outputted by said first transmitter.

12. A mobile communication method comprising:
(a) providing a radio cell station having a first transmitter outputting a first transmission signal at a first power and a second transmitter outputting a second transmission signal at a second power lower than said first power;
(b) obtaining data corresponding to a distance between said radio cell station and a personal station communicating with said radio cell station, and judging whether or not said data exceeds a predetermined value;

(c) outputting said second transmission signal from said second transmitter of said radio cell station to said personal mobile station, when said data exceeds said pre-determined value; and (d) outputting said first transmission signal from said first transmitter of said radio cell station to said personal mobile station, when said data does not exceed said pre-determined value, said (c) outputting further includes:

(e) outputting said first transmission signal from said first transmitter of said radio cell station to said personal mobile station, when said data exceed s said pre-determined value and communication channels assigned to said second transmission signal outputted by said second transmitter are all busy, wherein said communication channels are composed of the predetermined number of transmission slots assigned to said second transmission signal.

13. A personal Handy-phone System (PHS) public cell station apparatus comprising:

a single body; and a plurality of transmitters contained in said single body, wherein said plurality of transmitters include:

a first transmitter which outputs a first transmission signal at a first power wherein a plurality of slots assigned to a first frame in said first transmission signal are composed of a control channel used by controlling outgoing/incoming call and a plurality of said communication channels capable of communicating a plurality of mobile station at the same time, and a second transmitter which outputs a second transmission signal at a second power lower than said first power wherein a plurality of slots assigned to a second frame in said second transmission signal are composed of a plurality of said communication channels.

14. A PHS public cell station apparatus according to claim 13, wherein said first frame is provided with one slot assigned to said control channel and three slots assigned to said communication channels, and said second frame is provided with three slots assigned to said communication channels.

15. A PHS public cell station apparatus according to claim 13, further comprising:

a controller selectively activating one of said first transmitter or second transmitter based on positioning data corresponding to a position of said personal mobile station such that said activated transmitter communicates with said PHS public cell station apparatus using a transmission signal.

16. A PHS public cell station apparatus according to claim 14, wherein said first transmitter communicates with a personal mobile station in a first transmitting area and said second transmitter communicates with a personal mobile station in a second transmitting area wherein all of said second transmitting area is inside said first transmitting area; and further comprising a controller which controls said first transmitter to be activated when a personal mobile station communicating with said PHS public cell station apparatus is inside said first transmitting area except said second transmitting area or when said personal mobile station is inside said second transmitting area and all of said communication channels of said second transmitter is assigned to another personal mobile stations, and which controls said second transmitter to be activated when said personal mobile station is inside said second transmitting area and at least one of said communication channels of said second transmitter is not assigned to another personal mobile stations.

* * * * *